United States Patent
Peng et al.

(10) Patent No.: US 11,994,273 B1
(45) Date of Patent: May 28, 2024

(54) LIGHT FIXTURE WITH REDUNDANCY PROTECTION

(71) Applicant: Guangzhou Haoyang Electronic Co., Ltd., Guangzhou (CN)

(72) Inventors: Yingru Peng, Guangzhou (CN); Weikai Jiang, Guangzhou (CN); Weiliang Chen, Guangzhou (CN); Wenfeng Chen, Guangzhou (CN); Zhiguang Liang, Guangzhou (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/240,785

(22) Filed: Aug. 31, 2023

(30) Foreign Application Priority Data

Mar. 31, 2023 (CN) .......................... 202320688894.2

(51) Int. Cl.
| | |
|---|---|
| *F21V 21/108* | (2006.01) |
| *F21V 14/00* | (2018.01) |
| *F21V 15/01* | (2006.01) |
| *F21V 23/00* | (2015.01) |
| *F21Y 115/30* | (2016.01) |

(52) U.S. Cl.
CPC .......... *F21V 21/108* (2013.01); *F21V 14/006* (2013.01); *F21V 15/01* (2013.01); *F21V 23/003* (2013.01); *F21Y 2115/30* (2016.08)

(58) Field of Classification Search
CPC ...... F21V 21/108; F21V 14/006; F21V 15/01; F21V 23/003
See application file for complete search history.

(56) References Cited

U.S. PATENT DOCUMENTS

| | | | | |
|---|---|---|---|---|
| 4,884,008 | A * | 11/1989 | Bossler | F21V 14/04 362/804 |
| 5,038,261 | A * | 8/1991 | Kloos | F21V 21/14 362/386 |
| 5,588,733 | A * | 12/1996 | Gotou | B60Q 1/18 362/466 |
| 6,843,588 | B2 * | 1/2005 | Iwamoto | B60Q 1/12 362/469 |
| 9,346,396 | B2 * | 5/2016 | Nave | F21S 41/28 |

(Continued)

*Primary Examiner* — Bryon T Gyllstrom
(74) *Attorney, Agent, or Firm* — MUNCY, GEISSLER, OLDS & LOWE, PC

(57) ABSTRACT

A light fixture with redundancy protection includes a light head with a light source inside, a driving mechanism for driving the light head to change the projection direction, an angle detector for detecting the projection direction of the light head, and an original micro-control unit and a redundancy micro-control unit both being coupled to a controller. The original micro-control unit serves to receive an angle control signal from the controller and forward same to the driving mechanism, the redundancy micro-control unit serves to receive the angle control signal from the original micro-control unit or the controller, and both the original micro-control unit and the redundancy micro-control unit are coupled to the angle detector. A safety protection unit coupled to the controller is further included which is for conducting safety protection actions according to a feedback signal from the original micro-control unit or from the redundancy micro-control unit.

12 Claims, 4 Drawing Sheets

(56) References Cited

U.S. PATENT DOCUMENTS

| | | | |
|---|---|---|---|
| 2010/0296285 A1* | 11/2010 | Chemel | F21V 21/00 |
| | | | 362/249.1 |
| 2013/0038524 A1* | 2/2013 | Otsuki | G06F 3/0425 |
| | | | 348/E5.09 |
| 2019/0077306 A1* | 3/2019 | Duncan | F21V 5/04 |
| 2020/0300445 A1* | 9/2020 | Fujisawa | F21V 21/30 |
| 2023/0190403 A1* | 6/2023 | Stroelin | A61B 90/30 |
| | | | 600/249 |

* cited by examiner

LIGHT FIXTURE WITH REDUNDANCY PROTECTION

CROSS REFERENCE TO RELATED APPLICATIONS

The present application claims priorities from Chinese Application No. CN 202320688894.2 filed on Mar. 31, 2023, all of which are hereby incorporated herein by reference.

TECHNICAL FIELD

The present invention relates to the technical field of stage light fixtures, and more particularly, relates to a light fixture with redundancy protection.

BACKGROUND

With development of the laser lighting technology, laser lighting is generally used in many fields of illumining, such as stage performance or entertainment or the like, to enrich stage lighting effects. However, it is well known that light fixtures with laser lighting usually emit light beams in high power, which has damage to the retina of the human eye or camera devices, causing harm to a certain degree.

With regard to this problem, an angle sensor is configurated to position the projection direction and region of the light beam so as to keep away from the region where personnel and camera devices are distributed, or when the light beams approach to the region, a light barrier is switched into the light path. However, such way still have limitations, for example, the angle sensor locates in a complex electromagnetic environment, so that signals fed back are prone to being interfered by the environment. In addition, controlling to the light barrier will fail in a case that the associated controller has been damaged, the laser thus cannot be blocked in time, or it is unable to make the laser keep away from the region where personnel and camera devices are distributed.

SUMMARY

For this, the present invention provides a light fixture with redundancy protection, in which a safety protection unit can still work normally even when an original micro-control unit has been damaged, thus avoiding harm to the personnel and camera devices.

According to the present invention, the light fixture with redundancy protection includes a light head with a light source inside, a driving mechanism for driving the light head to change the projection direction, an angle detector for detecting the projection direction of the light head, and an original micro-control unit and a redundancy micro-control unit both being coupled to a controller. In the inventive stage light, the original micro-control unit serves to receive an angle control signal from the controller and forward same to the driving mechanism, the redundancy micro-control unit serves to receive the angle control signal from the original micro-control unit or the controller, and both the original micro-control unit and the redundancy micro-control unit are coupled to the angle detector. In the inventive stage light, a safety protection unit is further included which is for conducting safety protection actions according to a feedback signal from the original micro-control unit or a feedback signal from the redundancy micro-control unit, and the safety protection unit being connected to the controller.

In the inventive light fixture with redundancy protection, the angle control signal from the controller is received by the original micro-control unit and forwarded to the driving mechanism to change the irradiation direction of the light head driven by the driving mechanism. Simultaneously, the actual angular position of the light head detected by the angle detector is sent to the original micro-control unit and the redundancy micro-control unit. Meanwhile, the angle control signal from the controller or the original micro-control unit is acquired by the redundancy micro-control unit. Then comparison between the actual angular position of the light head and the angle control signal is performed by both the original micro-control unit and the redundancy micro-control unit. As a result, as long as the light head 100 is determined not reaching the position required by the angle control signal by any one of the original micro-control unit and the redundancy micro-control unit, such determination result is directly or indirectly fed back to the safety protection unit. Accordingly, the safety protection unit controls associated components to take actions for safety protection. Therefore, in this way, even if the original micro-control unit has been damaged, the redundancy micro-control unit can also play a protective role to avoid the personnel or camera devices from irradiation of the light head.

In particular, in order to allow the light beam of the light head to irradiate in any position, a support arm for supporting the light head to rotate by the driving mechanism and a base for supporting the support arm to rotate by the driving mechanism are further included, and the angle detector can detect the rotation angle of the light head and/or the support arm to comprehensively calculate the actual angular position of the light head.

In such configuration, the angle detector is preferably attached to the rotation axis of the light head or the rotation axis of the support arm. As it is convenient to detect the actual angular position of the light head or the support arm, which can be free from transmission error when the light head or the support arm is attached to a driving shaft of the driving mechanism.

For generating abundant light effects, at least one effect module of a shading module, a light filtering module, a gobo module, a color filter module, a light shaping module, a focusing module, a prism module, a light homogenizing module, or a magnifying module for changing the lighting effect is further arranged in the light head, which allows the light beam to respectively achieve light shading, color mixture, being patterned, dyeing, light forming, focusing, beam splitting, frosting and scaling effects and the combination thereof.

As the mentioned effect module is required to switch into the light path to intercept the light beam and thus generate the corresponding lighting effect, the safety protection unit is preferably designed to be a driving unit of the effect module, which can obtain synergistic effects. As such, the safety protection unit, upon receiving the feedback signal, will control the effect module to take actions to intercept the light beam to reduce the light beam emitted from a light outlet of the light head, except lighting effect, as well as lowering harm to humans or components irradiated.

More preferably, the output end of both the original micro-control unit and the redundancy micro-control unit are coupled to the controller. In this situation, as long as the controller determines that one of the original micro-control unit and the redundancy micro-control unit has confirmed the light head not reaching the position required by the angle control signal, the result of the original micro-control unit or the redundancy micro-control unit is fed back to the safety protection unit through the controller, and accordingly the safety protection unit then controls the corresponding components to take actions for safety protection.

As driving current of the light source exceeding a threshold is susceptible to causing danger, a current detection unit for detecting the current of the light source is further included according to the present invention, which is coupled to the redundancy micro-control unit or the controller. Accordingly, the driving current of the light source can be obtained by the current detection unit, if the obtained driving current of the light source exceeds the threshold, the redundancy micro-control unit feeds back the situation directly or indirectly to the safety protection unit, so that the safety protection unit can further control the corresponding components to take actions for safety protection.

Additionally or Alternatively, the safety protection unit is particularly a driving unit of the light source. In such situation, the safety protection action is to drive the light source to conduct protection actions, such as lowering the power or directly turning off the light fixture.

As the projection distance of the light fixture is generally 20-50 m, the position of a light spot will produce a large displacement with the angle of the light head slightly changed, which may be irradiated to the personnel or camera devices, the safety protection unit thus is required to respond quickly. For this, the redundancy micro-control unit is preferable in direct communication with the safety protection unit, therefore the feedback signal of the redundancy micro-control unit is directly sent to the safety protection unit, the safety protection unit thus have very high response speed. Alternatively, the output end of both the original micro-control unit and the redundancy micro-control unit is in direct communication with the safety protection unit through an NOR gate. With the NOR gate, as long as one of the original micro-control unit and the redundancy micro-control unit confirms the light head not reaching the position required by the angle control signal, the NOR gate will directly send the feedback signal to the safety protection unit.

According to the inventive stage light, the angle detector may be preferably a photoelectric encoder, a magnetic encoder, an inductance encoder or a capacitance encoder. However, such analogous detector is sufficient as long as it is able to detect the projection direction of the light head.

According to the inventive stage light, the driving mechanism may preferably be a stepping motor, which thus can receive a PWM signal for control.

According to the inventive stage light, the light source is preferably of a laser type, which has high brightness, while with small divergence angle of the light beam.

DETAILED DESCRIPTION

Figure 1:
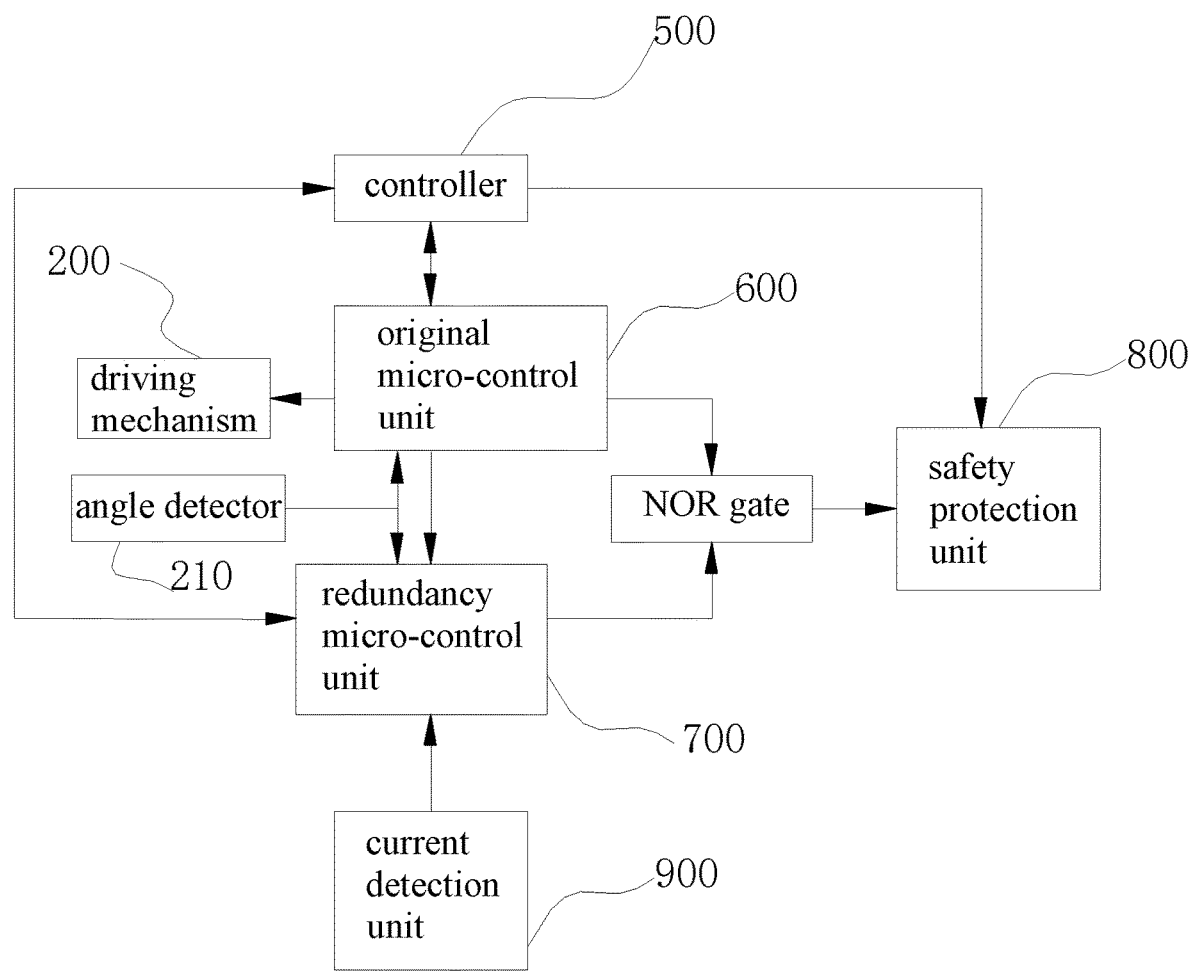
FIG. 1 is a schematic view showing the principle of a light fixture with redundancy protection according to an embodiment of the present invention.

The accompanying drawings are for exemplary illustration only, and should not be construed as limitations on this invention. In order to better illustrate this embodiment, some parts in the accompanying drawings may be omitted, enlarged or reduced, and they do not represent the size of the actual product. For those skilled in the art, it is understandable that certain well-known structures and descriptions thereof in the drawings may be omitted. The positional relationship described in the drawings is only for exemplary illustration, and should not be construed as limitations on this invention.

Figure 3:
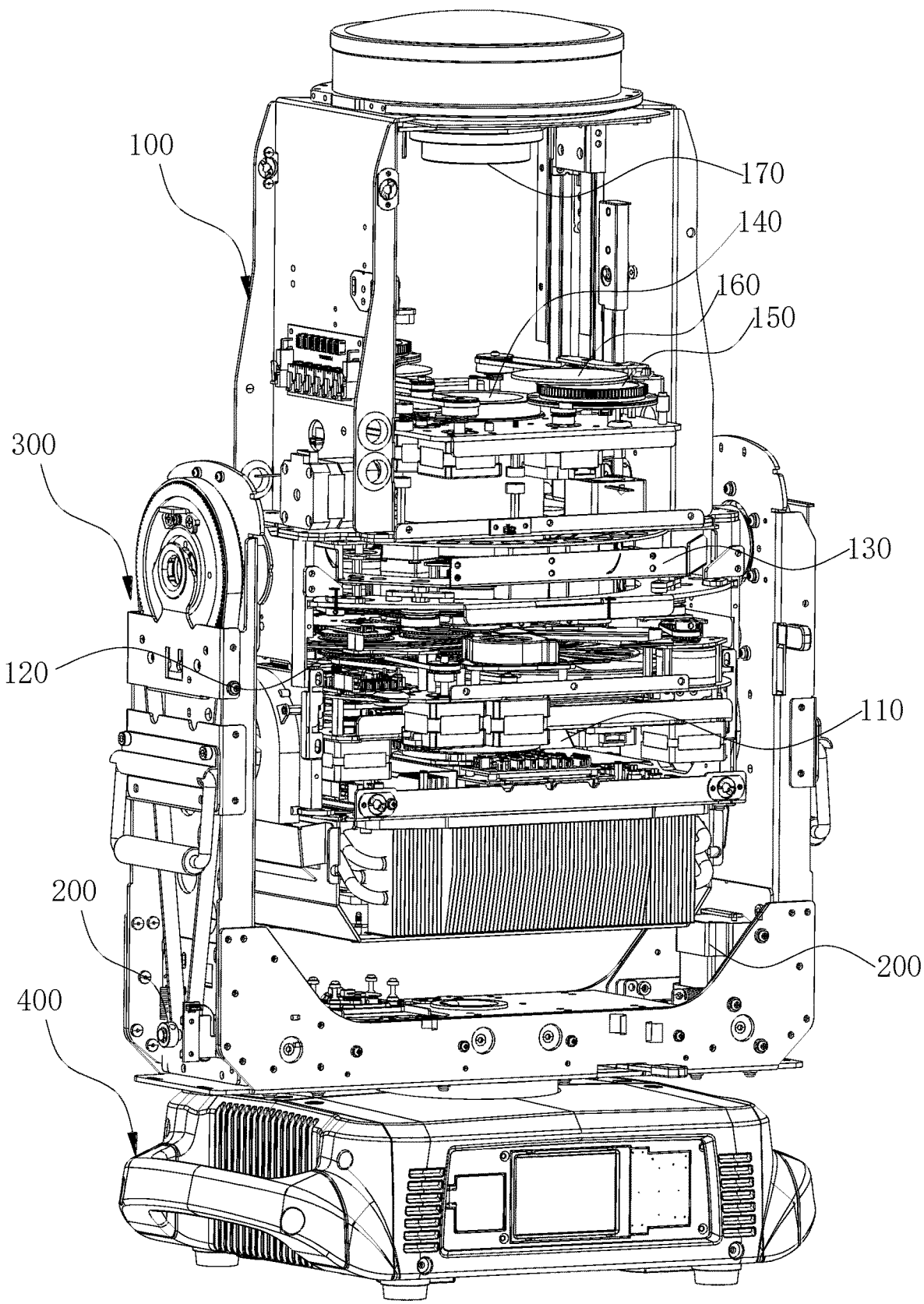
FIG. 3 is a schematic view of an overall structure of the light fixture with redundancy protection according to an embodiment of the invention.

With reference to FIGS. 1 and 3, a light fixture with redundancy protection is provided according to an embodiment of the present invention, including a light head 100 with a light source 110 inside, a driving mechanism 200 for driving the light head 100 to change the projection direction thereof, an angle detector 210 (shown in FIG. 4) for detecting the projection direction of the light head 100, an original micro-control unit 600 and a redundancy micro-control unit 700 both connected to a controller 500, in which the original micro-control unit is configured to receive an angle control signal from the controller 500 and forward same to the driving mechanism 200, the redundancy micro-control unit 700 is configured to receive the angle control signal from the original micro-control unit 600 or the controller 500, and the original micro-control unit 600 and the redundancy micro-control unit 700 are both connected to the angle detector 210. A safety protection unit 800 is further included which is configured to conduct safety protection actions according to a feedback signal from the original micro-control unit 600 or a feedback signal of the redundancy micro-control unit 700, the safety protection unit 800 being connected to the controller 500.

In the light fixture of the present embodiment, the angle control signal from the controller 500 is received by the original micro-control unit 600 and forwarded to the driving mechanism 200 to change the irradiation direction of the light head 100 driven by the driving mechanism. With the actual angular position of the light head 100 detected by the angle detector 210, it can be further determined that whether the light head 100 has been changed to the required position controlled by the driving mechanism 200 according to the angle control signal. In the present embodiment, corresponding detection results of the actual angular position are sent to the original micro-control unit 600 and the redundancy micro-control unit 700 by the angle detector 210. Meanwhile, the angle control signal from the controller 500 or the original micro-control unit 600 is acquired by the redundancy micro-control unit 700. Then comparison between the actual angular position of the light head 100 and the angle control signal is performed by both the original micro-control unit 600 and the redundancy micro-control unit 700. As a result, as long as the light head 100 is determined not reaching the position required by the angle control signal by any one of the original micro-control unit 600 and the redundancy micro-control unit 700, such determination result is directly or indirectly fed back to the safety protection unit 800. Accordingly, the safety protection unit 800 controls associated components to take action for safety protection. Therefore, in this way, even if the original micro-control unit has been damaged, the redundancy micro-control unit can also play a protective role to avoid the personnel or camera devices from irradiation of the light head 100.

In order to achieve safety protection, the safety protection unit 800 may be served to control the light source 110 to reduce power, turn off the light source 110, or block the light emitted from the light source 110 by using a shading member within the light head 100, according to actual demands. It should be noted that both the original micro-control unit 600 and the redundancy micro-control unit 700 are in form of MCU, which is well known common components in the art.

As shown in FIG. 3, a support arm 300 for supporting the light head 100 to rotate and a base 400 for supporting the support arm 300 to rotate are further preferably included. In this case, the driving mechanism 200 can drive the light head 100 and/or the support arm 300 to rotate to allow the light beam of the light head 100 can irradiate in any position. The angle detector 210 serves to detect the rotation angle of the light head 100 and/or the support arm 300 to comprehensively calculate the actual angular position of the light head 100. When necessary, the angular position of the light head 100 is calculated in combination with the mounting angle of the base 400, especially when the base 400 is hung horizontally or obliquely reversed.

Figure 4:
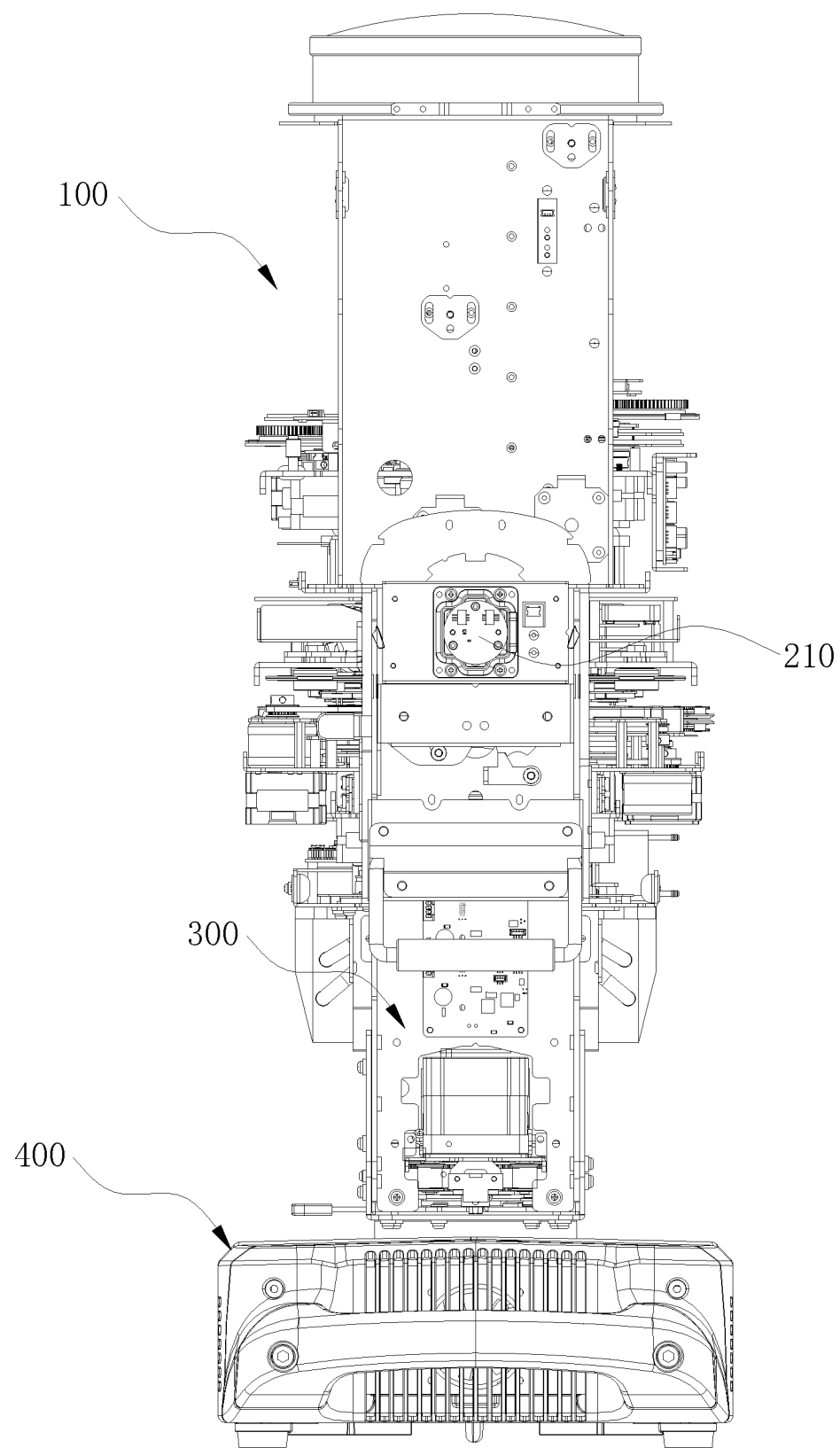
FIG. 4 is a side view of the light fixture with redundancy protection according to an embodiment of the present invention.

Further referring to FIG. 4, the angle detector 210 is preferably attached to the rotation axis of the light head 100 or the rotation axis of the support arm 300. With such configuration, it is convenient to detect the actual angular position of the light head 100 or the support arm 300, which can be free from transmission error when attached to the driving shaft of the driving mechanism 200.

Referring back to FIG. 3, in a preferred embodiment of the present invention, at least one effect module of a shading module, a light filtering module, a gobo module 120, a color filter module, a light shaping module 130, a focusing module 140, a prism module 150, a light homogenizing module 160, or a magnifying module 170 for changing the lighting effects is further arranged in the light head 100, allowing the light beam to achieve light shading, color mixture, being patterned, dyeing, light forming, focusing, beam splitting, frosting or scaling effect and the combination thereof. The effect modules are all well-known common components in the art and will not be described in detail herein.

In a preferred embodiment of the present invention, the safety protection unit 800 is preferably designed to be a driving unit of the effect module. In this case, the safety protection unit 800, upon receiving the feedback signal, will control the corresponding effect module to take action, particularly to intercept the light beam with completely blocking or partially transmitting the light to reduce the light beam emitted from a light outlet of the light head 100, thereby lowering harms to the humans or the components irradiated. In addition, such configuration may result in synergistic effects, except achieving safe protection, corresponding lighting effect can be simultaneously achieved, as the mentioned effect module is required to switch into the light path to intercept the light beam and thus generate the lighting effect.

Referring back to FIG. 1, in a preferred embodiment of the present invention, the output end of both the original micro-control unit 600 and the redundancy micro-control unit 700 is coupled to the controller 500. In such case, as long as the controller 500 determines that one of the original micro-control unit 600 and the redundancy micro-control unit 700 has confirmed the light head 100 not reaching the position required by the angle control signal, the result of the original micro-control unit 600 or the redundancy micro-control unit 700 is first fed back to the controller 500, then fed back same to the safety protection unit 800, and accordingly the safety protection unit 800 then controls the corresponding components to take action for safety protection.

The controller 500 serves to be the "brain" of the light fixture, which is for receiving signals input from a console by an operator to control the whole operation of the light fixture.

In addition, a current detection unit 900 for detecting the current of the light source 110 is further included in a preferred embodiment of the present invention, which is coupled to the redundancy micro-control unit 700 or the controller 500. The driving current of the light source 110 can be obtained through the current detection unit 900. As known, driving current of the light source 110 exceeding a threshold is susceptible to causing danger. In the present embodiment, the redundancy micro-control unit 700 can feed back such situation directly or indirectly to the safety protection unit 800, so that the safety protection unit 800 can further control the corresponding components to take action for safety protection.

In one case, the current detection unit 900 may be a part of a driving unit of the light source 110, which is for obtaining the driving current of the light source 110.

When the light fixture is on work, it is the first that the current detection unit 900 detects whether the current of the light source 110 exceeds the threshold, then whether the driving mechanism 200 is out of step is determined according to the actual angle position detected by the angle detector 210 and the angle control signal, and then whether the light head 100 irradiates the region where the personnel or camera devices are located is determined according to the detection result of the angle detector 210. According to the embodiment, if there is any problem in any process, the safety protection unit 900 will conduct a safety protection action, thereby improving the whole safe protection of the light fixture.

In another preferred embodiment of the present invention, the safety protection unit 800 is designed to be a driving unit of the light source 110. In such case, the safety protection action is to drive the light source 110 to conduct a protection action, such as lowering the power or directly turning off the light fixture.

Figure 2:
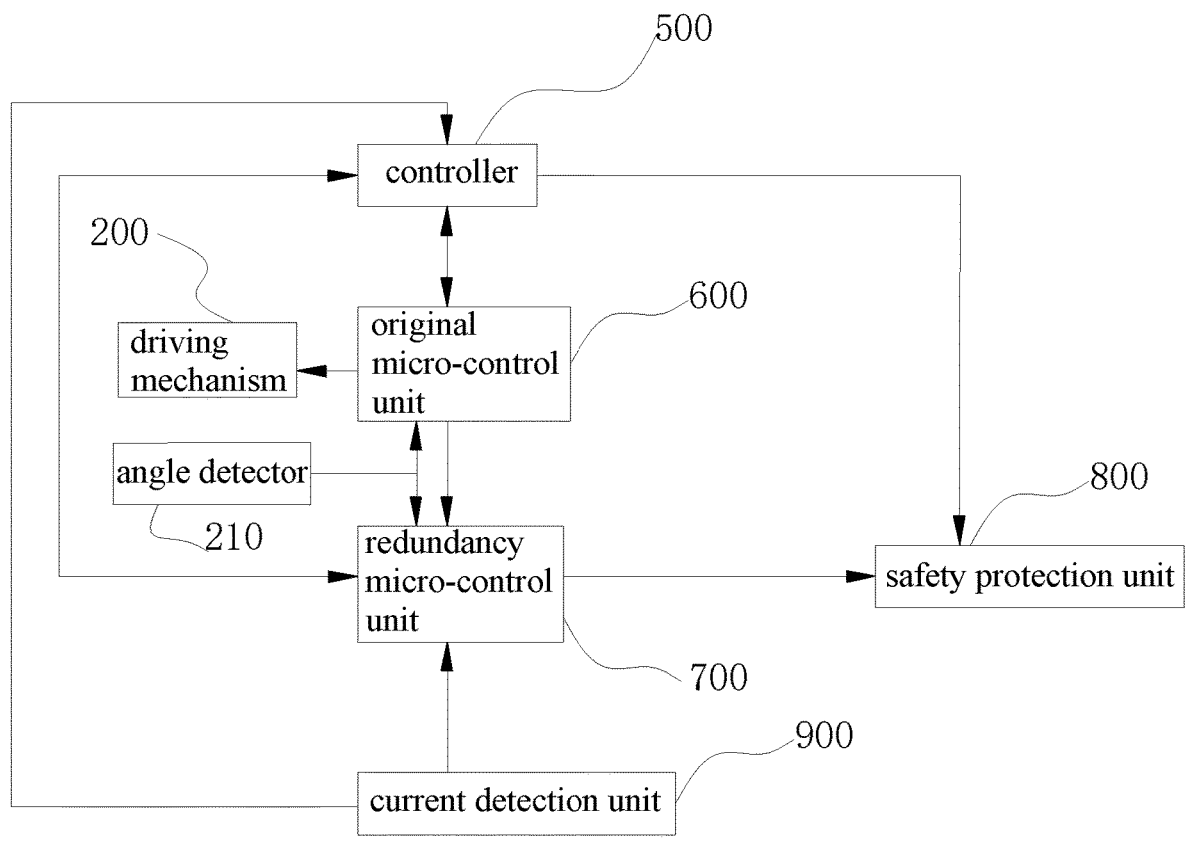
FIG. 2 is a schematic view showing the principle of the light fixture with redundancy protection according to another embodiment of the present invention.

As known, the projection distance of the light fixture is generally 20 m-50 m, the position of a light spot will produce a large displacement with the angle of the light head 100 slightly changed, which may be irradiated to the personnel or camera devices, and therefore the safety protection unit is required to respond quickly. Referring to FIG. 2, in another preferred embodiment of the present invention, the redundancy micro-control unit 700 is in direct communication with the safety protection unit 800, that is, the feedback signal of the redundancy micro-control unit 700 will be directly sent to the safety protection unit 800. With such configuration, the safety protection unit 800 thus will have very high response speed. Alternatively, the output end of both the original micro-control unit 600 and the redundancy micro-control unit 700 is in direct communication with the safety protection unit 800 through an NOR gate, as shown in FIG. 1. With the NOR gate, as long as one of the original micro-control unit 600 and the redundancy micro-control unit 700 determines the light head 100 not reaching the position required by the angle control signal, the NOR gate will directly send the feedback signal thereof to the safety protection unit 800.

According to the context of the present invention, the angle detector 210 is preferably in form of a photoelectric encoder, a magnetic encoder, an inductance encoder or a capacitance encoder. Such analogous detector is sufficient as long as it is able to detect the projection direction of the light head 100. With reference to FIG. 3, in this embodiment, the magnetic encoder is selected as the angle detector 210.

The driving mechanism 200 is preferably a stepping motor, which can receive a PWM signal for control.

The light source 110 is preferably of a laser type, which has high brightness while with small divergence angle of the light beam.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A light fixture with redundancy protection, comprising
a light head with a light source inside,
a driving mechanism for driving the light head to change a projection direction thereof,
an angle detector for detecting the projection direction of the light head,
an original micro-control unit and a redundancy micro-control unit, both being coupled to a controller,
wherein the original micro-control unit is configured to receive an angle control signal from the controller and forward same to the driving mechanism, the redundancy micro-control unit is configured to receive the angle control signal from the original micro-control unit or the controller, and both the original micro-control unit and the redundancy micro-control unit are connected to the angle detector; and
a safety protection unit coupled to the controller, which is configured to conduct safety protection actions according to a feedback signal from the original micro-control unit or a feedback signal of the redundancy micro-control unit.

2. The light fixture according to claim 1, further comprising a support arm for supporting the light head to rotate and a base for supporting the support arm to rotate, the driving mechanism is configured to drive the light head and/or the support arm to rotate, and the angle detector is configured to detect the rotation angle of the light head and/or the support arm.

3. The light fixture according to claim 2, wherein the angle detector is attached to a rotation axis of the light head or a rotation axis of the support arm.

4. The light fixture according to claim 1, wherein at least one effect module of a light shading module, a light filtering module, a gobo module, a color filter module, a light shaping module, a focusing module, a prism module, a light homogenizing module, or a magnifying module for changing lighting effects is further arranged in the light head.

5. The light fixture according to claim 4, wherein the safety protection unit is designed to be a driving unit of the effect module.

6. The light fixture according to claim 5, wherein an output end of both the original micro-control unit and the redundancy micro-control unit is coupled to the controller.

7. The light fixture according to claim 1, further comprising a current detection unit for detecting current of the light source, which is coupled to the redundancy micro-control unit or the controller.

8. The light fixture according to claim 7, wherein the safety protection unit is designed to be a driving unit of the light source.

9. The light fixture according to claim 8, wherein the redundancy micro-control unit is in direct communication with the safety protection unit, or an output end of both the original micro-control unit and the redundancy micro-control unit is in direct communication with the safety protection unit through an NOR gate.

10. The light fixture according to claim 1, wherein the angle detector is in form of a photoelectric encoder, a magnetic encoder, an inductance encoder or a capacitance encoder.

11. The light fixture according to claim 1, wherein the driving mechanism is in form of a stepping motor.

12. The light fixture according to claim 1, wherein the light source is of a laser type.

* * * * *